United States Patent [19]

Zuchtriegel

[11] 4,438,372
[45] Mar. 20, 1984

[54] MULTIPLE LOW-PRESSURE DISCHARGE LAMP OPERATING CIRCUIT

[75] Inventor: Anton Zuchtriegel, Taufkirchen, Fed. Rep. of Germany

[73] Assignee: Patent-Treuhand Gesellschaft fur elektrische Gluhlampen mbH, Munich, Fed. Rep. of Germany

[21] Appl. No.: 415,413

[22] Filed: Sep. 7, 1982

Related U.S. Application Data

[63] Continuation of Ser. No. 193,254, Oct. 1, 1980, abandoned.

[30] Foreign Application Priority Data

Oct. 16, 1979 [DE] Fed. Rep. of Germany ....... 2941822

[51] Int. Cl.³ .................................... H05B 37/02
[52] U.S. Cl. .................................... 315/224; 315/210; 315/242; 315/244; 315/283; 315/250; 315/290
[58] Field of Search ............... 315/219, 220, 223, 224, 315/243, 244, 324

[56] References Cited

U.S. PATENT DOCUMENTS

| 3,163,207 | 12/1964 | Schultz | 357/80 |
| 3,283,224 | 11/1966 | Erkan | 357/80 |
| 3,753,071 | 8/1973 | Engel et al. | 315/201 |
| 3,771,014 | 11/1973 | Paget | 315/243 |
| 4,051,413 | 9/1977 | Abadie | 315/324 |
| 4,075,476 | 2/1978 | Pitel | 315/278 |
| 4,259,614 | 3/1981 | Kohler | 315/324 |
| 4,370,600 | 1/1983 | Zansky | 315/244 |

Primary Examiner—Harold Dixon
Attorney, Agent, or Firm—Frishauf, Holtz, Goodman & Woodward

[57] ABSTRACT

To operate at least one, and preferably a plurality of fluorescent lamps, a self-oscillating transistor push-pull switching oscillator, using two similar transistors (T1, T2), is connected to respective lamps (3, 3', 3''), with an oscillatory circuit (4, 4', 4'') to operate at audio, supersonic or low high frequency, for example in the 20 kHz range. Each lamp operating circuit has an individual series resonance circuit (4, 4', 4'') which includes a ballast inductance (L1, L1', L1'') and a capacitor (C1, C1', C1''). For multiple operation, the respective lamp operating circuits are connected in parallel. A special starting circuit (10) and a control circuit (9a, 9b; L2, L2', L2''; L3, L3', L3'') for the switching transistors insures low-loss operation. The transistors (T1, T2) are the deenergized in case of malfunction by a monitoring circuit (11; L4, L4', L4'') which includes a thyristor (21) which fires to disable oscillatory operation of the oscillator circuit and thereby prevents over-voltage conditions upon electrical removal of a lamp load.

24 Claims, 5 Drawing Figures

MULTIPLE LOW-PRESSURE DISCHARGE LAMP OPERATING CIRCUIT

This is a continuation of application Ser. No. 193,254 filed Oct. 1, 1980, now abandoned.

CROSS REFERENCE TO RELATED APPLICATION

U.S. Ser. No. 127,372, filed Mar. 5, 1980, now U.S. Pat. No. 4,291,254, Sept. 22, 1981, ARLT et al, assigned to the assignee of the present application.

The present invention relates to an operating circuit for one, or a plurality of low-pressure discharge lamps, for example fluorescent lamps, which permit selective operation of the lamp, or lamps with a minimum of circuit components and excellent operating efficiency.

BACKGROUND AND PRIOR ART

It has previously been proposed to operate fluorescent lamps at a frequency different from power supply frequency by rectifying alternating power supply and generating a higher frequency by using switching transistors of the same conductivity type, for example npn transistors, serially connected across the d-c power supply and connected in push-pull to a lamp circuit which includes an inductance and a capacitor to form a series resonant circuit.

Fluorescent lamp circuits of this type permit operation of the lamps at frequencies above power network frequencies—typically 50 Hz or 60 Hz, and, additionally, operation of the lamps from d-c circuits. The frequency used is usually in the low kilohertz range. Operating lamps at frequencies substantially higher than power network frequencies has the advantage of higher light efficiency. Additionally, utilizing electronic conversion networks, at a higher frequency, has the advantage that the inductive elements in the circuits will be smaller, thus have less weight and volume and cause lower heat losses in comparison to inductive elements operating at power network frequencies.

A circuit illustrating an arrangement in which a single lamp is operated at a frequency in excess of power frequency is shown in British Pat. No. 898,580, in which two transistors of similar conductivity type operate in push-pull. The push-pull transistor switch is connected over a voltage divider, consisting of two serially connected capacitors, to a 50 V d-c source. The circuit is intended for operation of a low-pressure discharge lamp with preheatable electrodes. The required starting and operating voltage is generated by a transformer which has auxiliary windings at the secondary in order to provide heater current for the electrodes. The transistors are controlled over the primary winding of the transformer, which is connected over the parallel circuit of a capacitor and a resistor with the bases of the transistors. The frequency of the oscillator, which is self-excited, is determined by the parallel resonant circuit consisting of the secondary winding and a capacitor. A typical oscillator frequency is about 1360 Hz.

Operation of a single low-pressure discharge lamp with a series resonant circuit has also been proposed, in which the series resonant circuit consists of a ballast or similar inductance serially connected with the lamp, and a capacitor connected in parallel to the lamp (see U.S. Pat. No. 3,084,283, corresponding to German Patent DE-PS No. 11 05 517). This is a typical transistor oscillator circuit in which the emitters of the two transistors are placed on a similar voltage point, the collectors are connected to the respective terminals of a transformer, and a portion of the winding thereof is connected to the lamp operating circuit. D-c operating voltage is supplied to the oscillator.

The circuits which are known and which have been described in the literature to use alternating current at a frequency above power network frequency have only moderate efficiency and, due to the comparatively long or slow switching cycles, are comparatively expensive in their construction.

THE INVENTION

It is an object to provide an operating circuit for one, or multiple low-pressure discharge lamps, that is, typically, for fluorescent lamps, which is capable of operating in the audio or high-frequency range, which is efficient and thus operates with low losses, and which is simple to construct. The circuit should be capable of being directly connected to customary illuminating power networks and, additionally, preferably should be versatile for connection also to other supplies, for example to d-c supplies. The circuit should permit connection of high-power lamps requiring relatively high starting or ignition voltages and operating voltages. The circuit is particularly useful for use with multiple lamps.

Briefly, in accordance with the invention, each one of the lamp operating circuits includes a separate or individual inductance which is coupled to a separate or individual capacitor and connected in a series resonance circuit. The respective individual lamp supply circuits—including the respective individual series resonance circuits—are connected in parallel to two serially connected transistors of the same conductivity type, operating in push-pull oscillator circuit.

In accordance with a preferred feature of the invention, the inductances, forming ballasts, are ferrite core transformers of inductances. A typical operating frequency is, for example, 20 kHz, permitting use of components of small size.

The circuit permits operation of multiple lamps, in parallel while requiring only a single transistor push-pull switch. It permits connection of high-power lamps with relatively high ignition or starting voltage and operating voltage. Operation of the lamp or lamps at the high audio or supersonic or low high-frequency range permits use of components of extremely small size, so that the respective inductances and capacitors, used in the discharge lamp operating circuit, will require but little space. A substantial decrease in volume and weight with respect to customary ballast and other components operating at power line frequency can be obtained, thus requiring only components of much lower cost and using much less material. The switching transistors can be optimally controlled so that the operation of the switching transistors will be under low-loss efficient conditions.

In accordance with a feature of the invention, the discharge lamp operating circuit includes a protective circuit to prevent difficulties which might arise if one of the lamps is removed, burned out, or otherwise does not fire. The circuit components required and the connections are simple.

Structurally, the arrangement can be so made that heat from the switching transistors is readily dissipated, so that the switching transistors will operate under optimum conditions.

Figure 1:
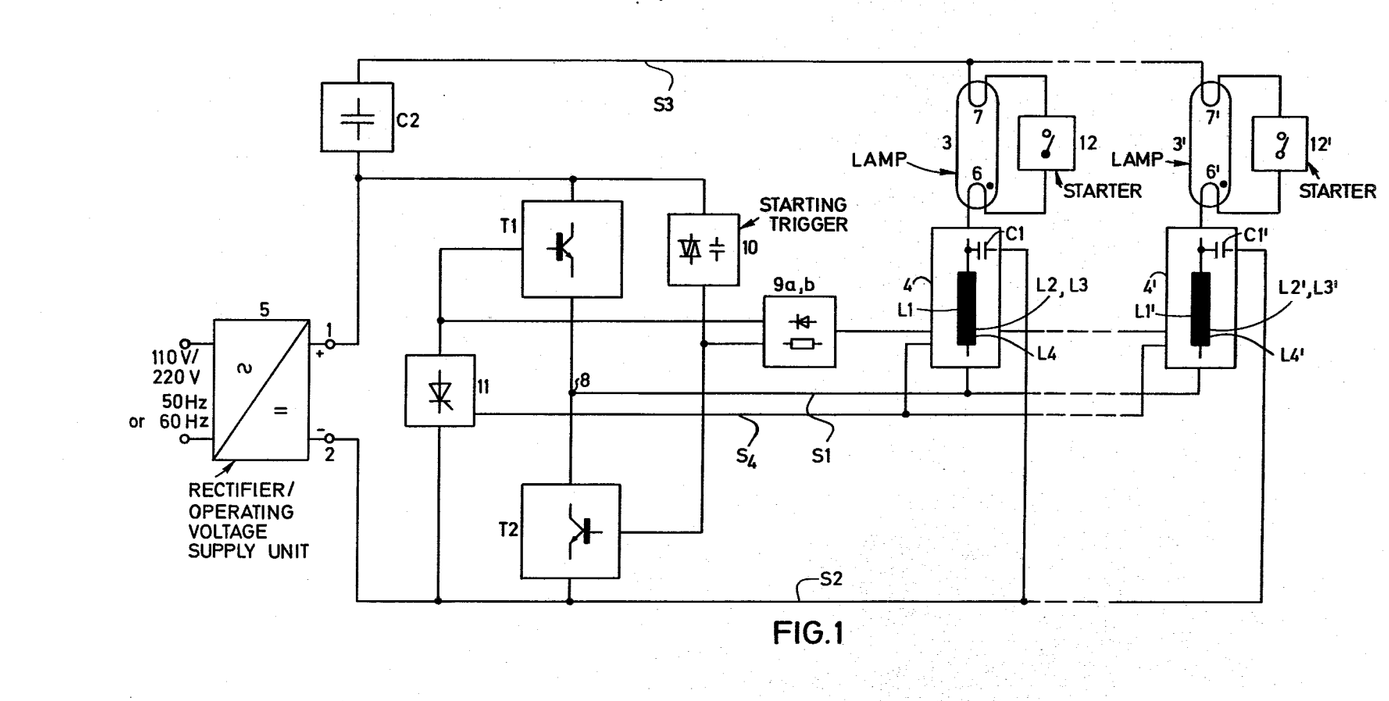
FIG. 1 is a highly schematic block circuit diagram of the operating circuit in accordance with the present invention.

The operating lamp circuit utilizes direct current available at terminals 1, 2 (FIG. 1). The direct current is obtained, for example, by a power network supply unit 5 connectable, for example, to 110 V or 220 V power supply, at 50 or 60 Hz. The d-c power available at terminals 1, 2 from the supply unit 5 is connected to the emitter-collector path of two serially connected transistors T1, T2. The transistors T1, T2 are connected to oscillate as a self-exciting, self-oscillating push-pull oscillator, which supplies at least one, and preferably a plurality, of fluorescent lamps 3, 3', 3" . . . , connected in parallel. Any desired number of lamps can be operated in parallel upon suitable dimensioning of the components of the supply circuit to be capable to carry the requisite operating power. In accordance with a feature of the invention, each one of the lamp operating circuits has its own individual inductance L1, L1' connected thereto forming, together with a capacitor C1, C1', a series resonant circuit 4, 4'. The lamp operating circuits and the respective series resonant circuits are mutually connected in parallel. If only one lamp is to be operated, only a single series resonance circuit 4 is needed.

The d-c supply at terminals 1, 2 preferably should have only little ripple, or waviness and undulations, preferably a ripple of not above 20%. The rectifier-/operating voltage supply unit 5 which supplies the necessary d-c voltage for power supply networks preferably is a bridge rectifier with a filter capacitor connected to the d-c output. Upon supply with 220 V, terminals 1, 2 will have a voltage of about 310 V thereacross. If the unit is designed for connection to a 110 V power network, then it preferably includes a symmetrical voltage doubler circuit to provide a d-c output voltage in the approximate 300 V range. The respective lamp operating circuits will receive only half the voltage of terminals 1, 2 from the respective transistor push-pull switches T1, T2. The series resonance circuits 4, 4' can provide a substantially higher voltage to the individual lamps 3, 3', particularly during starting or initial ignition. The operating voltage for the lamps 3, 3' supplied by the circuit is entirely adequate.

The circuit, of course, can be operated directly from a d-c supply network, if suitable voltage is available, without the supply unit 5; or from a low-voltage d-c supply, if the unit 5 additionally includes an inverter-transformer-rectifier arrangement, for exampe a bride rectifier with a filter capacitor similar to a rectifier for a 220 V power network at the output of the transformer.

Figure 3:
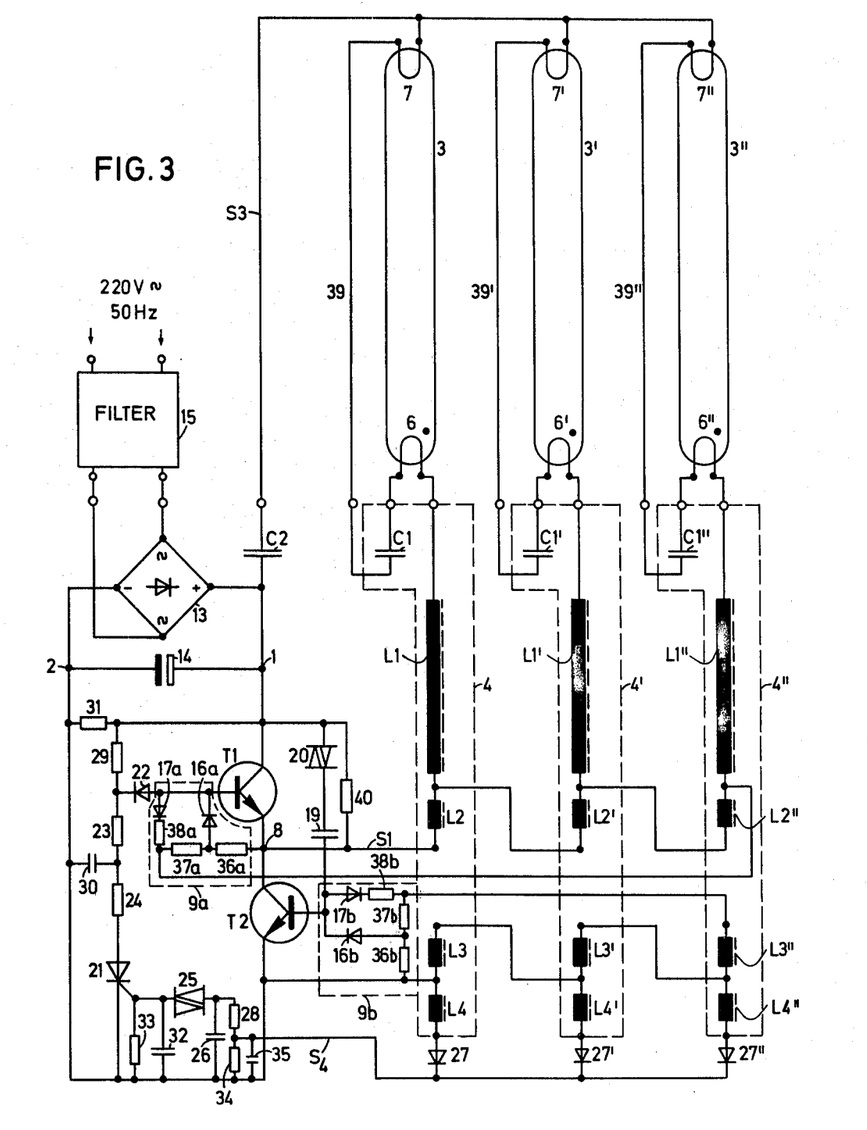
FIG. 3 is a circuit diagram illustrating another embodiment.

The first electrodes 6, 6' of lamps 3, 3' are connected through the respective inductances L1, L1', which form part of the resonance circuit, to a first bus, or connection line S1, which is connected to the center junction 8 between the transistors T1, T2 of the push-pull transistor switch. The electrodes 6, 6' are additionally connected to the capacitor C1, C1' of the oscillatory circuit and to a third bus S2, which is connected to the negative terminal 2 of the d-c supply. FIG. 3 shows the circuit arrangement in detail. The second electrodes 7, 7' of the lamps 3, 3' are connected to a bus S3, which is connected through a capacitor C2 of relatively large capacity to the other terminal, that is, to the positive terminal 1 of the d-c supply. Capacitor C2 which, preferably, has ten times the capacity value of the oscillatory circuit capacitors C1, C1' effectively places the bus S3 at the center voltage of the d-c supply source. The lamps 3, 3' are supplied with this circuit with a-c of higher frequency, that is, in the audible, supersonic or low high-frequency range. The impedance of the capacitor C2 at these frequencies is low, so that lamp currents are only negligibly attenuated. The capacitor C2, effectively, only is a reactive load. The cycling frequency of the transistor oscillator is determined by the components of the series resonance circuits 4, 4', the respective lamps 3, 3' providing for damping of the oscillatory circuits.

The oscillatory circuit inductances are wound with separate windings to provide control energy for the switching transistors T1, T2 of the push-pull oscillatory circuits. Control windings L2, L2' and L3, L3' are coupled to the ballast or series connected inductances L1, L1' and connected over a network including high-speed switching diodes and resistors to the bases of the respective switching transistors T1, T2.

Starting of the transistor oscillator is insured by a starting circuit 10 which triggers one of the transistors, in the example shown the transistor T2, that is, the transistor connected to the negative terminal 2 of the d-c supply, over its base. As soon as transistor T2 becomes conductive, the oscillatory circuits 4, 4' will start to oscillate, and the control currents supplied to the base of the transistors, which are connected in the positive feedback network, maintain oscillation.

The series resonance circuits 4, 4' operate stably and with low inherent losses so long as the respectively connected lamp 3, 3', forming a connected load, accepts energy. The circuits 4, 4' must be damped in such a manner that the transistors T1, T2 are reliably controlled to maintain oscillation. If the load is interrupted, for example if one of the lamps is removed, the voltage will rise substantially resulting in substantial heat losses in the circuit components. Unless protective circuits are provided, the components may be destroyed.

In accordance with a feature of the invention, a protective circuit 11 is provided to prevent destruction of the components by disabling the transistors T1, T2 shortly after an interruption or malfunction is detected, for example after one second. This safety circuit also prevents high voltages from arising at the lamp socket, or on still connected pins of the lamp, so that operating personnel is protected. The protective circuit 11 includes a controlled switching element, for example a thyristor, which is connected to a bus S4 for control purposes and has its main switching path connected between the base of the switching transistor T1 connected to the positive terminal of the d-c supply source and the negative terminal 2 thereof. The bus S4 controlling the safety circuit 11 is connected to windings L4, L4', inductively coupled to the inductances L1, L1'.

The series resonance circuit will have a high voltage appear on the capacitors C1, C1' when the lamp 3, 3' is not operating. Thus, for starting and when the lamp is first connected, low-pressure lamps 3, 3' will fire or start without preheating of electrodes. Thus, the lamps are cold-starting. To insure long lamp life and reliable starting, starter switches 12, 12' can be provided which normally bridge the lamps 3, 3' when the power supply is connected. Connection of the switches 12 will bridge the discharge path of the lamps to permit preheating of the electrodes 6, 7, 6', 7', respectively. The starter switches 12, 12', after a suitable preheating time, will open, resulting in starting and firing of the lamps. The switches 12, 12' can be rapid switching four-layer diodes, glow switches capable of carrying a high glow current, and the like, in order to prevent firing or ignition of the lamps with electrodes which have not yet been preheated. FIG. 3 illustrates an embodiment without starter switches.

Figure 2:
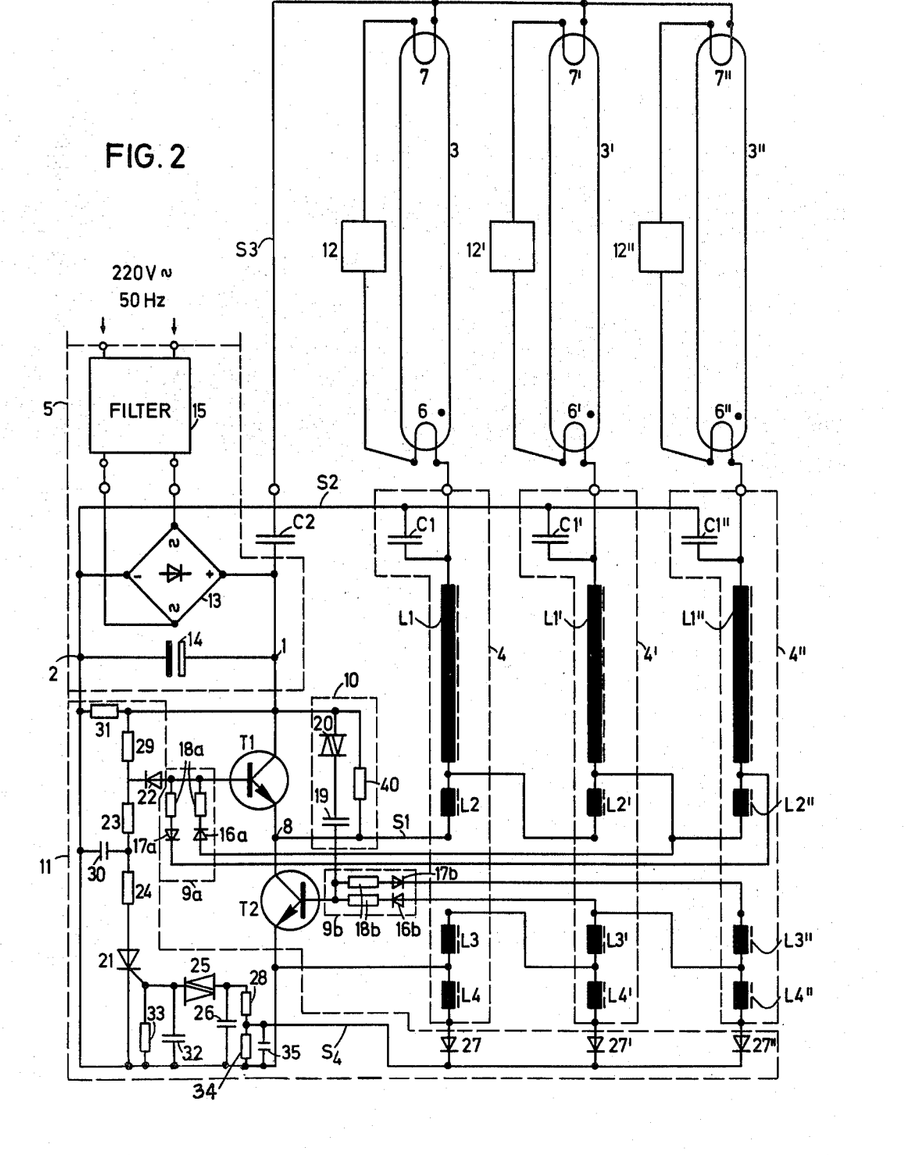
FIG. 2 is a detailed circuit diagram illustrating one embodiment.

The detailed circuit of the general block diagram of FIG. 1 is illustrated in FIG. 2, in which an operating circuit for three 45 W/1.5 m fluorescent lamps 3, 3', 3'' is shown. The firing or ignition voltage of these lamps is above 400 V. The lamp operating frequency is about 20 kHz, and the entire load placed on the network is about 150 W, including the losses of the network components of the operating circuits.

The circuit of FIG. 2 is similar to that of FIG. 1, and similar parts have been given similar reference numerals and will not be explained again. The supply unit 5 is shown in detail, and consists of a bridge rectifier 13 and a filter capacitor 14. A network filter 15 isolates high-voltage frequencies with respect to the power network to prevent interference of the lamp operating circuit with other circits connected to the power network.

The control windings, L2, L2', L2'', L3, L3', L3'' are divided when operating multiple lamps in multiple parallel operations, so that each one of the circuits need supply only the n-th portion of the control energy. Optimally, the sum of the voltage portions should be at a level sufficient to control the switching transistors T1, T2 into quasi saturation. The groups of the control windings L2, L2' . . . L2$^n$ and L3, L3' . . . L3$^n$ are galvanically separated from each other. The respective windings of one group are serially connected, bridging the respective base-emitter paths of the respective switching transistors T1, T2.

The control networks 9a, 9b, respectively, connected to the windings L2, L2', . . . L2$^n$, and L3, L3', L3$^n$ each include a pair of diodes 16a, 17a, 16b, 17b, respectively, oppositely poled, and serially connected to a current limiting resistor 18a, 18b, respectively. The respective diode 16a, 16b which is poled in the direction of current flow to the base of the respective transistor T1, T2, has a lower control voltage applied thereto than the diode 17a, 17b which is poled in blocking direction.

The diode 16a, 16b, respectively, is connected to the junction between the two last control windings L2', L2'' or L3', L3'', respectively. The diode 17a, 17b, respectively, is connected to the end terminal of the last control winding L2'', L3'', respectively, This arrangement of circuits insures optimum switching of the transistors T1, T2, since the minority carriers within the semiconductor crystal are better removed from the blocking junction. During switching transition, no dangerous overlap of the blocking and conducting phases of the transistors T1, T2 will result.

The starting circuit 10 which triggers the transistor T2 has a series circuit of a capacitor 19 and a diac 20 which is connected to the positive terminal 1 of the power supply network. The collector of the transistor T2 is connected over resistor 40 to the positive terminal 1 as well. Upon energization with d-c, and when the firing voltage of the diac is reached, the transistor T2 will receive a voltage pulse rendering it conductive. Triggering occurs once upon operation of the lamp.

The protective circuit 11 preferably uses a thyristor 21 which is poled in conductive direction to conduct current to the negative terminal 2. The anode of thyristor 21 is connected over a diode 22 and voltage dropping resistors 23, 24 to the base of the transistor T1. The control electrode of the thyristor 21 is serially connected through a diac 25 to a capacitor 26 and then through a voltage divider 28, 34 to the bus S4. Control energy is provided by the control windings L4, L4' . . . L4$^n$, coupled to the respective oscillating circuits 4, 4', 4$^n$. Other ways of supplying control energy can be used, for example from taps from other windings, directly from other windings—with interposition of decoupling networks—and the like. The control energy, for example derived from the windings L4, L4', L4'', as shown in FIG. 2, is applied over diodes 27, 27', 27'' to an R/C network consisting of capacitor 26 and its charge resistor 28. The R/C network provides a timing network having a predetermined time constant for the response of the protective circuit 11. The components 26, 28 are so relatively dimensioned that the thyristor 21 will be reliably disabled from responding when the lamp is in the ignition phase. The diac 25 provides the switching threshold to distinguish between normal operation and operation with a lamp removed, that is, load-free or excess voltage operation. When the diac 25 breaks down, thyristor 21 will trigger. Upon conduction of thyristor 21, the base of transistor T1 will lose control energy since it is connected to the negative terminal 2 of the d-c supply. Transistor T1 will block and consequently the oscillatory circuits 4, 4', 4'' are deenergized. The thyristor 21 is connected over resistor 29 with the positive terminal 1 of the power supply. Since the thyristor 21 is connected to the positive terminal, it will remain conductive so that further oscillatory cycles are suppressed. The diode 22 blocks a-c voltages from the anode circuit of the thyristor 21. The R/C network, consisting of resistor 23 and capacitor 30, provides protection against spurious firing of the thyristor 21 upon starting of the circuit. Resistor 31 is a discharge resistor for capacitor 14 when the supply circuit is disconnected. The control electrode of the thyristor 21 is also connected to a capacitor 32 with which a resistor 33 is in parallel, the other terminals of the capacitor and resistor being connected to the cathode of the thyristor 21. Capacitor 32 prevents undesired trigger conduction of the thyristor 21 in case of spurious excess voltage peaks which might be applied to the control electrode thereof. Resistor 33 prevents response of the protective circuit if high leakage currents of the diac 25 should occur, for example upon excessive ambient temperatures. The R/C network 28, 26 has a discharge circuit 34 connected in parallel thereto. A further parallel capacitor 35 operates as a filter capacitor for voltage peaks which might arise within the control circuit of the thyristor 21. Upon response of the protective circuit 11, it is necessary to disconnect the supply to the thyristor 21 in order to return the thyristor 21 to blocked state and subsequent renewed operation of the lamp circuit.

Embodiment of FIG. 3: The circuit of FIG. 3 is similar to that of FIG. 2, and differs only in the arrangement of the transistors T1, T2 with the associated control networks 9a, 9b, and in the circuit arrangement of the capacitors C1, C1', C1'' of the series resonance circuits 4, 4', 4''. Additionally, the circuit of FIG. 3 does not use starter switches.

The control networks 9a, 9b of FIG. 3 include voltage dividers consisting of resistors 36a, 37a, 36b, 37b, to which the respective diodes 16a, 17a, 16b, 17b, respectively, are connected. The voltage dividers are connected to bridge the control windings L2, L2', L2" and L3, L3', L3", respectively. The resistors 37a, 37b, as well as the additional resistors 38a, 38b, operate as current limiting resistors for the diodes in the networks. The diodes 16a, 16b poled in conductive direction with respect to current flow to the transistors T1, T2 has a lower control voltage applied thereto than the respective diodes 17a, 17b poled in blocking direction. Such a circuit arrangement is particularly suitable if only a single lamp is to be operated from the circuit. The capacitors C1, C1', C1" of the series resonance circuit are so connected that the additional starter switches for the lamps 3, 3', 3" can be eliminated and, instead, a connecting bridging conductor 39, 39', 39" in series with the capacitors C1, C', C1" of the resonance circuits 4, 4', 4" is used, connected across the respective electrodes 6, 7, 6', 7', 6", 7" and to connect the electrode windings to the ballast inductances L1, L1', L1". The bridge conductors 39₁, 39", 39", connect the capacitors C₁, C₁' and C₁L" across the lamp the electrodes 6, 7; 6' 7' and 6" 7".

The circuit of FIG. 3 has the advantage that upon removal of one of the lamps, for example of lamp 3, the respective series resonance circuit 4, 4' or 4" is interrupted, and thus is disabled. The operation of the other lamps is not thereby influenced. The thyristor 21 will fire only upon other interference or malfunction.

Figure 4A:
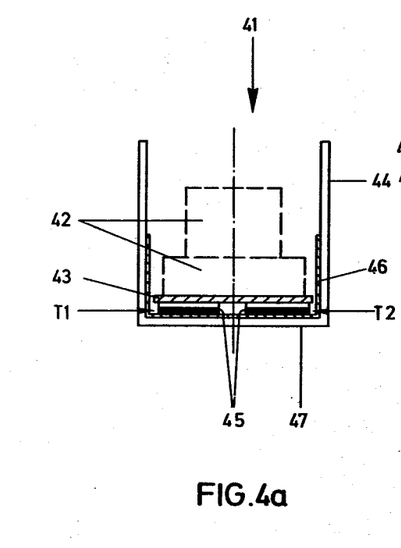
FIGS. 4a and 4b are a transverse sectional view and longitudinal, part-phantom view, respectively, in highly schematic representation, illustrating a suitable structural arrangement of components used in the circuit.
Figure 4B:
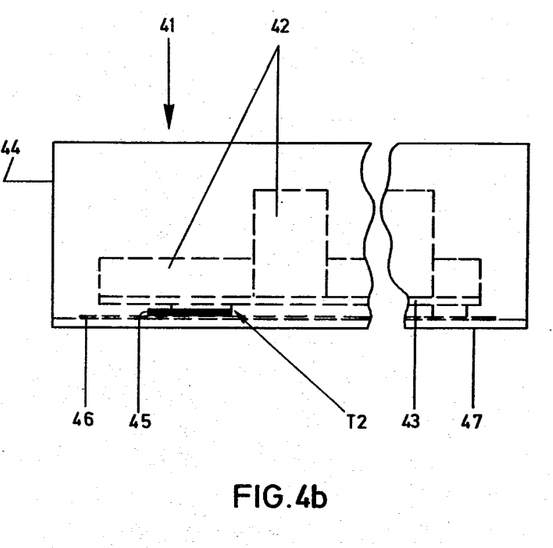

The structural arrangement of the circuit components is best seen in FIG. 4 (collectively) which is so made that heat dissipation of operating heat from the switching transistors T1 T2 and the other components is insured. All circuit elements, collectively shown at 42 in FIGS. 4a and 4b of the lamp networks, including power supply and lamp sockets, are soldered to a support plate 43 which is preferably an insulating printed circuit board carrying conductors only on one side and, as shown, on the bottom side of the plate, with respect to the orientation of FIGS. 4a, 4b. A housing 44 forming a heat sink and heat dissipation element, and made of good heat conductive material, for example an aluminum channel, surrounds the plate 43. The switching transistors T1, T2 which, for optimum switching conditions, should be loaded with about 1 W for each transistor, are located at the conductor side, that is, on the bottom side of plate 43. The cooling surfaces 45 of the transistors are in heat conductive contact with the bottom 47 of the aluminum channel, and are electrically insulated therefrom by a heat transmitting insulting element 46. A suitable dimension for the aluminum housing is about 4×4×22 cm.

Various changes and modifications may be made, and features described in connection with one of the embodiments may be used with the other, within the scope of the inventive concept.

I claim:

1. Low-pressure discharge lamp operating circuit for connection to a plurality of discharge lamps (3, 3' ... 3ⁿ) having first and second electrodes (7, 6), said circuit comprising connection means (1, 2) for connection to a d-c source (5);

a self-excited push-pull oscillator circuit including two serially connected transistors (T1, T2) of the same conductivity type, connected across the d-c source and having a common junction (8);

a plurality of individual separate series resonance starting circuits (4, 4' ... ), connected to said serially connected transistors (T1, T2), each having a first terminal connected to the second electrode (6) of a respective lamp of the plurality of lamps, wherein the individual series resonance circuits (4, 4' ... ) each include a separate individual ballast inductance having a main winding (L1, L1' ... ) serially connected by a first terminal with the second lamp electrode (6) of a respective lamp, and a separate individual capacitor (C1, C1' ... ) serially connected to the main winding of the individual ballast inductance, and coupled in parallel to the respective lamp, said ballast inductances including inductively coupled first control windings (L2, L2' ... ) and second control windings (L3, L3' ... ) to form, with the main windings, individual transformers, in which the main winding forms the primary and the first and second control windings form secondary windings;

a first bus (S1) connecting said common junction (8) to the second terminals of the plurality of inductances, and hence through the inductances to the second electrodes (6) of the lamps;

a second bus (S3) connecting one of the connection means (1) on the d-c source (5) to the first electrodes (7) of the lamps, capacitor means (C2) in one of said buses to isolate d-c from the lamp electrodes (7, 6);

a control circuit to control said two transistors (T1, T2) for alternate conduction or blocking condition and to supply high-frequency alternating power to the lamps, including connection means (9a, 9b) between the emitters and bases of the transistors (T1, T2) and the first and second control windings (L2, L2' ... L3, L3' ... ), and a starting circuit (10) connected to the base of one (T2) of the transistors including means (20) for energizing said starting circuit upon connection of the lamp operating circuit to a power source;

wherein the main winding (L1) and the first and second control windings (L2, L3) are wound on a common core; and the first and second control windings (L2, L2' ... ; L3, L3' ... ) of the respective plurality of inductances are, respectively, connected in series, and the series-connected respective first and second control windings are connected in briding circuit relationship across the base-emitter paths of the respective transistors (T1, T2), with said connection means (9a, 9b) interposed therein.

2. Circuit according to claim 1, wherein the cores for the respective inductances and control windings comprise ferrite cores.

3. Circuit according to claim 1, wherein the connection means interconnecting the transistors (T1, T2) and the series resonance circuits (4, 4' ... ) comprise control networks (9a, 9b) connected to the bases of the respective transistors (T1, T2) each including a pair of oppositely poled diodes (16a, 17a; 16b, 17b);

the respective first control windings (L2, L2' ... ) being connected to one of the control networks (9a) and connected to the base of one (T1) of the transistors, and the second control windings (L3, L3' ... ) being connected to the other control network (9b) and to the base of the other transistor (T2);

and wherein the voltages applied to the respectively oppositely poled diodes are relatively of such value that the control voltage applied to the diode (16a, 16b) poled in conductive direction to the base of the respective transistor is less than the control voltage applied to the diode (17a, 17b) poled in blocking direction with respect to current flow to the base of the respective transistor (T1, T2).

4. Circuit according to claim 3, wherein the control networks (9a, 9b) include current limiting resistors (18a, 18b; 37a, 38a; 37b, 38b) connected to the respectively oppositely poled diodes (16a, 17a; 16b, 17b).

5. Circuit according to claim 3, wherein (FIG. 2) the diode (16a, 16b) poled in conductive direction with respect to the base of the respective transistor (T1, T2) is connected to the junction between the next-to-last and the last one of the respective control winding of the serially controlled windings (L2', L2"; L3', L3"), and the diode (17a, 17b) which is poled in blocking direction is connected to the last one of the respective control windings (L2", L3") whereby the voltage applied to said blocking direction poled diode will be higher than that applied to the conductively poled diode.

6. Circuit according to claim 3, wherein (FIG. 3) the respective networks (9a, 9b) include a voltage divider (36a, 37a; 36b, 37b) bridging the respective first and second control windings (L2, L2' . . . ; L3, L3' . . . );
and wherein the diode (16a, 16b) connected in conductive direction with respect to the base of the respective transistors (T1, T2) is connected to a tap point of the voltage divider, and the diode (17a, 17b) poled in blocking direction is connected to a higher voltage point at the voltage divider.

7. Circuit according to claim 1, further comprising a high-voltage disconnect safety circuit (11) including a voltage level responsive switching element (21) connected between the base of one of the transistors (T1) and one of the connection means (2) to said d-c source; and
circuit means (L4, L4' . . . ) coupled to the series resonant circuits and controlling the conductivity state of said switching element in accordance with voltage level of the series resonant circuits to block conduction of said one transistor upon occurrence of voltage above a predetermined level.

8. Circuit according to claim 7, wherein the circuit means comprises at least one third transformer control winding (L4, L4') inductively coupled to at least one of said ballast inductances (L1, L1') and connected to and controlling conduction of said voltage level responsive switching element (21) to conduction upon occurrence of excess voltage thereat to cause blocking of said one transistor (T1).

9. Circuit according to claim 1, further comprising a network coupling unit (5) adapted for connection to a power line network at power frequency and providing a direct current output voltage in the order of about 310 V.

10. Circuit according to claim 9, wherein the a-c power network has a voltage level of about 110 V; and said supply unit includes a symmetrical voltage doubling circuit.

11. Circuit according to claim 1, further including a combined support element and heat dissipation carrier (44);
a conductor support plate (43) insulatingly secured to said support plate and positioned in heat transfer relation thereto;
said transistors (T1, T2) being positioned on said insulating plate and in heat transfer relation to said support plate (44, 47).

12. Low-pressure discharge lamp operating circuit for connection to a plurality of discharge lamps (3, 3' . . . 3$^n$) having first and second electrodes (7, 6), said circuit comprising
connection means (1, 2) for connection to a d-c source (5);
a self-excited push-pull oscillator circuit including
two serially connected transistors (T1, T2) of the same conductivity type, connected across the d-c source and having a common junction (8);
a plurality of individual separate series resonance starting circuits (4, 4' . . . ), connected to said serially connected transistors (T1, T2), each having a first terminal connected to the second electrode (6) of a respective lamp of the plurality of lamps,
wherein the individual series resonance circuits (4, 4' . . . ) each include
a separate individual ballast inductance having a main winding (L1, L1' . . . ) serially connected by a first terminal with the second lamp electrode (6) of a respective lamp, and a separate individual capacitor (C1, C1' . . . ) serially connected to the main winding of the individual ballast inductance, and coupled in parallel to the respective lamp,
said ballast inductances including inductively coupled first control windings (L2, L2' . . . ) and second control windings (L3, L3' . . . ) to form, with the main windings, individual transformers, in which the main winding forms the primary and the first and second control windings form secondary windings;
a first bus (S1) connecting said common junction (8) to the second terminals of the plurality of inductances, and hence through the inductances to the second electrodes (6) of the lamps;
a second bus (S3) connecting one of the connection means (1) on the d-c source (5) to the first electrodes (7) of the lamps,
capacitor means (C2) in one of said buses to isolate d-c from the lamp electrodes (7, 6);
a control circuit to control said two transistors (T1, T2) for alternate conduction or blocking condition and to supply high-frequency alternating power to the lamps, including
connection means (9a, 9b) between the emitters and bases of the transistors (T1, T2) and the first and second control windings (L2, L2' . . . L3, L" . . . );
and a starting circuit (10) connected to the base of one (T2) of the transistors including means (20) for energizing said starting circuit upon connection of the lamp operating circuit to a power source,
wherein said lamp operating circuit further comprises a safety circuit (11) including a voltage level responsive switching element (21) connected between the base of one of the transistors (T1) and one of the connection means (2) to said d-c source;
and circuit means (L4, L4' . . . ) coupled to at least one of the series resonant circuits (4, 4'. . . ) and being further connected to and controlling the conductivity state of said switching element (21) in accordance with voltage level of said series resonant circuit or circuits (4, 4'), said switching element (21) being connected to said one transistor (T1) to block conduction thereof upon ocurrence of voltage above a predetermined level and in excess of a safe level.

13. Circuit according to claim 12, wherein the circuit means comprises at least one third transformer winding (L4, L4') inductively coupled to at least one of said ballast inductances (L1, L1') and connected to and controlling conduction of said switching element (21).

14. Circuit according to claim 12, wherein said controlled switching element comprises a thyristor (21) having its main switching path connected to a current limiting resistor (23, 24) and to a connection means (2) to the d-c source, poled to short-circuit the base-emitter circuit of said one transistor (T1) and its control gate connected to said circuit means (L4, L4' ... ).

15. Circuit according to claim 12, wherein the voltage level responsive switching element (21) comprises a controlled switching element (21), and
a voltage sensitive switching element (25) connected to the control electrode of the controlled switching element (21) and to an energy source representative of voltage across the lamp which, upon sensing of excess voltage, breaks down and provides firing control energy to the control electrode of the controlled switching element (21).

16. Circuit according to claim 15, wherein the voltage sensitive element comprises a diac, and a charge capacitor (26) connected thereto;
and the energy source provides charge energy for the charge capacitor and the diac, and comprises inductance winding means (L4, L4' ... ) inductively coupled to said at least one ballast inductance (L1, L1' ... ).

17. Circuit according to claim 16, including
a common parallel connection (S4) from the capacitor (26) and the diac (25) to the individual winding means including decoupling elements (27, 27' ... ) between the individual winding means and said common connection.

18. Circuit according to claim 15, wherein the circuit means comprises
at least one third transformer winding (L4, L4' ... ) inductively coupled to at least one of said ballast inductances (L1, L1') and connected to and controlling the voltage-sensitive switching element (25).

19. Circuit according to claim 12, further including a timing network (26, 28) connected to said controlled switching element to prevent spurious response thereof upon first connection and energization of the circuit.

20. Circuit according to claim 15, further including a capacitor (32) connected between the gate or control electrode of the thyristor (21) and the cathode thereof to suppress spurious noise pulses and spurious response of firing of the thyristor.

21. Circuit according to claim 14, further comprising a decoupling diode (22) and a resistor (29) connecting the base of one of the transistors (T1) to one terminal of the connection means (1).

22. Circuit according to claim 21, further comprising a resistor (23) and a capacitor (30) connecting the diode (22) to the other terminal (2) of the connection means, the R/C-network (23, 30) providing protection for the thyristor (21).

23. Low-pressure discharge lamp operating circuit for connection to a discharge lamp having first and second electrodes (7, 6),
said circuit comprising
connection means (1, 2) for connection to a d-c source (5);
a self-excited push-pull oscillator circuit including two serially connected transistors (T1, T2) of the same conductivity type, connected across the d-c source and having a common junction (8);
an individual series resonance starting circuit (4), connected to said serially connected transistors (T1, T2), having a first terminal connected to the second electrode (6) of the respective lamp,
wherein the series resonance circuit includes
an individual ballast inductance having a main winding (L1) serially connected by a first terminal with the second lamp electrode (6) of the lamp, and a separate individual capacitor (C1, C1' ... ) serially connected to the main winding of the individual ballast inductance, and coupled in parallel to the lamp,
said ballast inductance including an inductively coupled first control winding (L2) and a second control winding (L3) to form, with the main winding, an individual transformer, in which the main winding forms the primary, and the first and second control windings form secondary windings;
a first bus (S1) connecting said common junction (8) to the second termainl of the inductance, and hence through the inductance to the second electrode (6) of the lamp;
a second bus (S3) connecting one of the connection means (1) on the d-c source (5) to the first electrode (7) of the lamp,
capacitor means (C2) in one of said buses to isolate d-c from the lamp electrodes (7, 6);
a control circuit to control said two transistors (T1, T2) for alternate conduction or blocking condition and to supply high-frequency alternating power to the lamps, including
connection means including paired, reversely polarized diodes (16a, 17a, 16b, 17b), connected between the emitters and bases of the transistors (T1, T2) and the first and second control windings (L2), (L3),
and a starting circuit (10) connected to the base of one (T2) of the transistors including means (20) for energizing said starting circuit upon connection of the lamp operating circuit to a power source; and
wherein the main winding (L1) and the first and second control windings (L2, L3) are wound on a common core; and
the first and second control windings (L2) of the inductance are connected in bridging circuit relationship across the base-emitter paths of the respective transistors (T1, T2), with said connection means (9a, 9b) interposed therein.

24. Low-pressure discharge lamp operating circuit according to claim 23, further comprising
a third control winding (L4) located on said common core;
a safety circuit (11) including a voltage level responsive switching element (21, 25) connected between the base of one of the transistors (T1) and one of the connection means (2) to said d-c source;
the third control winding being connected to said voltage level responsive switching element (21, 25) and controlling the conductivity state thereof in accordance with the voltage level of said series resonant circuit, said voltage level responsive switching element being connected to said one transistor (T1) to block conduction thereof upon occurrence of voltage above a predetermined level and in excess of a safe level in said series resonant circuit.

* * * * *